US012621429B2

(12) United States Patent
Kim et al.

(10) Patent No.: US 12,621,429 B2
(45) Date of Patent: May 5, 2026

(54) TEST DEVICE AND TEST SYSTEM COMPRISING SAME

(71) Applicant: LG INNOTEK CO., LTD., Seoul (KR)

(72) Inventors: Sang Uk Kim, Seoul (KR); Min Yong Choi, Seoul (KR); Dong Choon Kim, Seoul (KR)

(73) Assignee: LG INNOTEK CO. LTD., Seoul (KR)

( * ) Notice: Subject to any disclaimer, the term of this patent is extended or adjusted under 35 U.S.C. 154(b) by 0 days.

(21) Appl. No.: 18/879,931

(22) PCT Filed: Jun. 27, 2023

(86) PCT No.: PCT/KR2023/008909
§ 371 (c)(1),
(2) Date: Dec. 30, 2024

(87) PCT Pub. No.: WO2024/005497
PCT Pub. Date: Jan. 4, 2024

(65) Prior Publication Data
US 2025/0337875 A1      Oct. 30, 2025

(30) Foreign Application Priority Data
Jun. 30, 2022      (KR) ........................ 10-2022-0080884

(51) Int. Cl.
*H04N 17/00* (2006.01)
*G06F 11/22* (2006.01)
*H04N 5/44* (2011.01)

(52) U.S. Cl.
CPC ....... *H04N 17/002* (2013.01); *G06F 11/2294* (2013.01); *H04N 5/4448* (2013.01)

(58) Field of Classification Search
CPC ..... H04N 17/00; H04N 17/002; H04N 5/4448
(Continued)

(56) References Cited

U.S. PATENT DOCUMENTS 10,154,225 B2      12/2018  Lyuh et al.
11,669,422 B2 *     6/2023  Kim ........................ G06F 11/27
714/30
(Continued)

FOREIGN PATENT DOCUMENTS

JP        2021-036425        3/2021
KR        10-0765010        10/2007
(Continued)

OTHER PUBLICATIONS

International Search Report dated Sep. 21, 2023 issued in Application No. PCT/KR2023/008909.

*Primary Examiner* — Trang U Tran
(74) *Attorney, Agent, or Firm* — KED & ASSOCIATES

(57)      ABSTRACT
A test device according to an embodiment includes a first substrate including a data conversion module having a first connector for receiving data acquired from an external equipment, an FPGA (Field Programmable Gate Array) for converting the received data, and a second connector for outputting the converted data; a second substrate including a test module including a third connector connected to the second connector of the first substrate and receiving the converted data, a test unit for performing a test operation using the data received through the third connector, a communication unit for transmitting test result information according to a test operation result of the test unit to an outside, and a control unit for controlling the test unit and the communication unit; and a housing for accommodating the first substrate and the second substrate.

10 Claims, 9 Drawing Sheets

(58) Field of Classification Search
USPC ................................................. 348/187, 180
See application file for complete search history.

(56) References Cited

U.S. PATENT DOCUMENTS

| | | | | |
|---|---|---|---|---|
| 11,988,709 B2* | 5/2024 | Kim | ................. | G01R 31/31701 |
| 2013/0141128 A1* | 6/2013 | Chen | ................... | G06F 11/2268 |
| | | | | 324/750.15 |

FOREIGN PATENT DOCUMENTS

| | | |
|---|---|---|
| KR | 10-2008-0021318 | 3/2008 |
| KR | 10-1853694 | 5/2018 |
| KR | 10-2124964 | 6/2020 |
| KR | 10-2176447 | 11/2020 |

* cited by examiner

【FIG. 1】
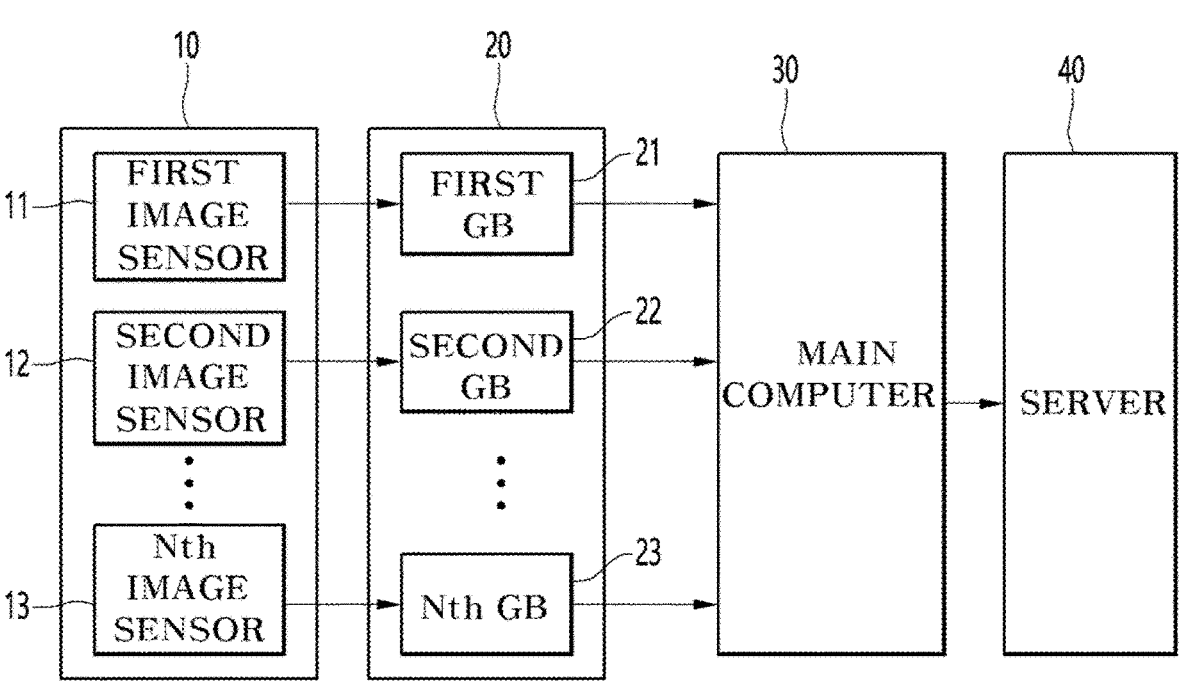

【FIG. 2】
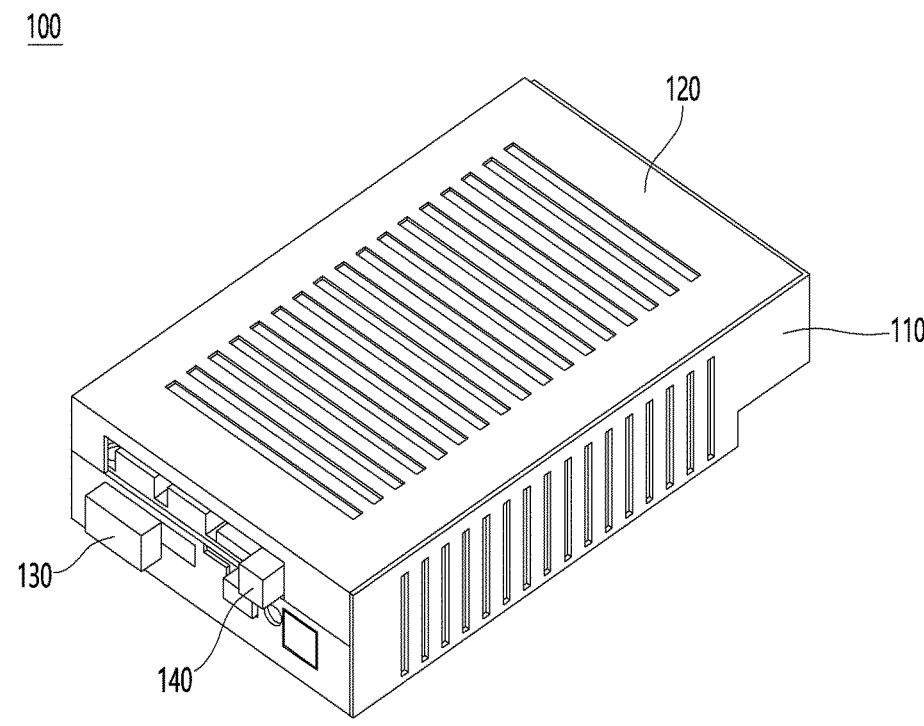

【FIG. 3】
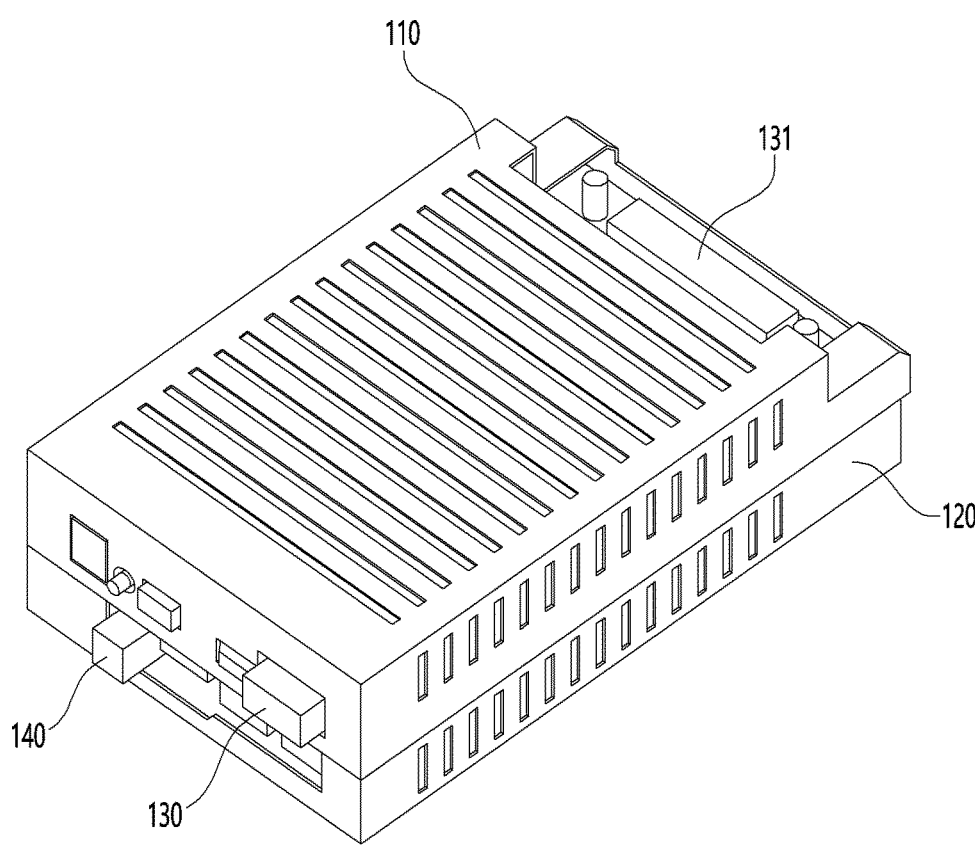

【FIG. 4】
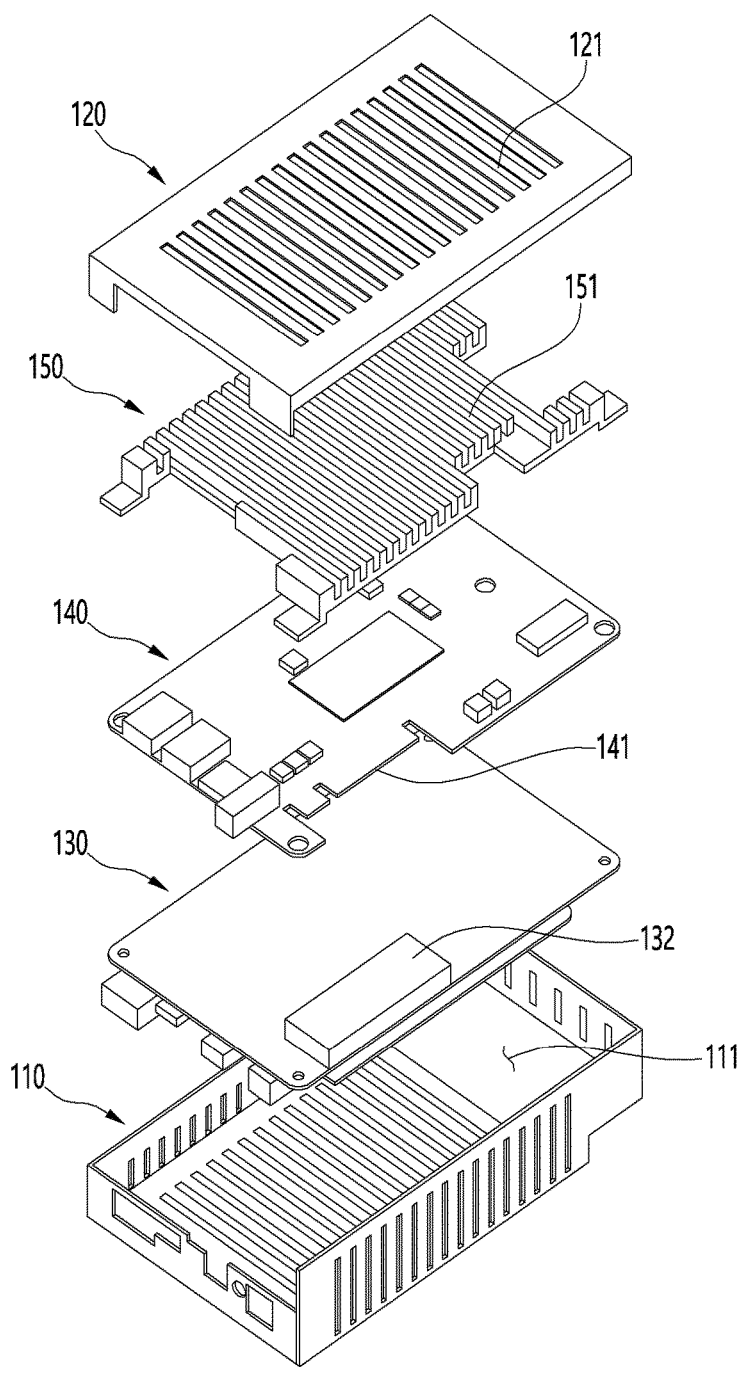

【FIG. 5】
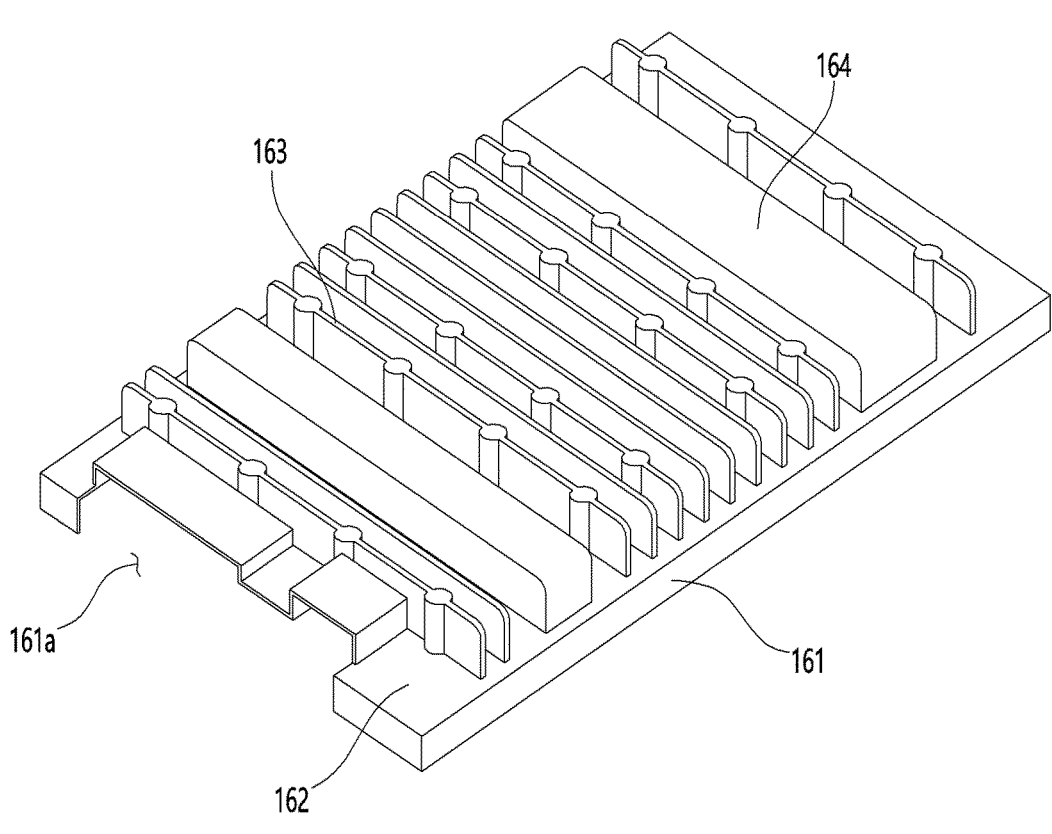

【FIG. 6】
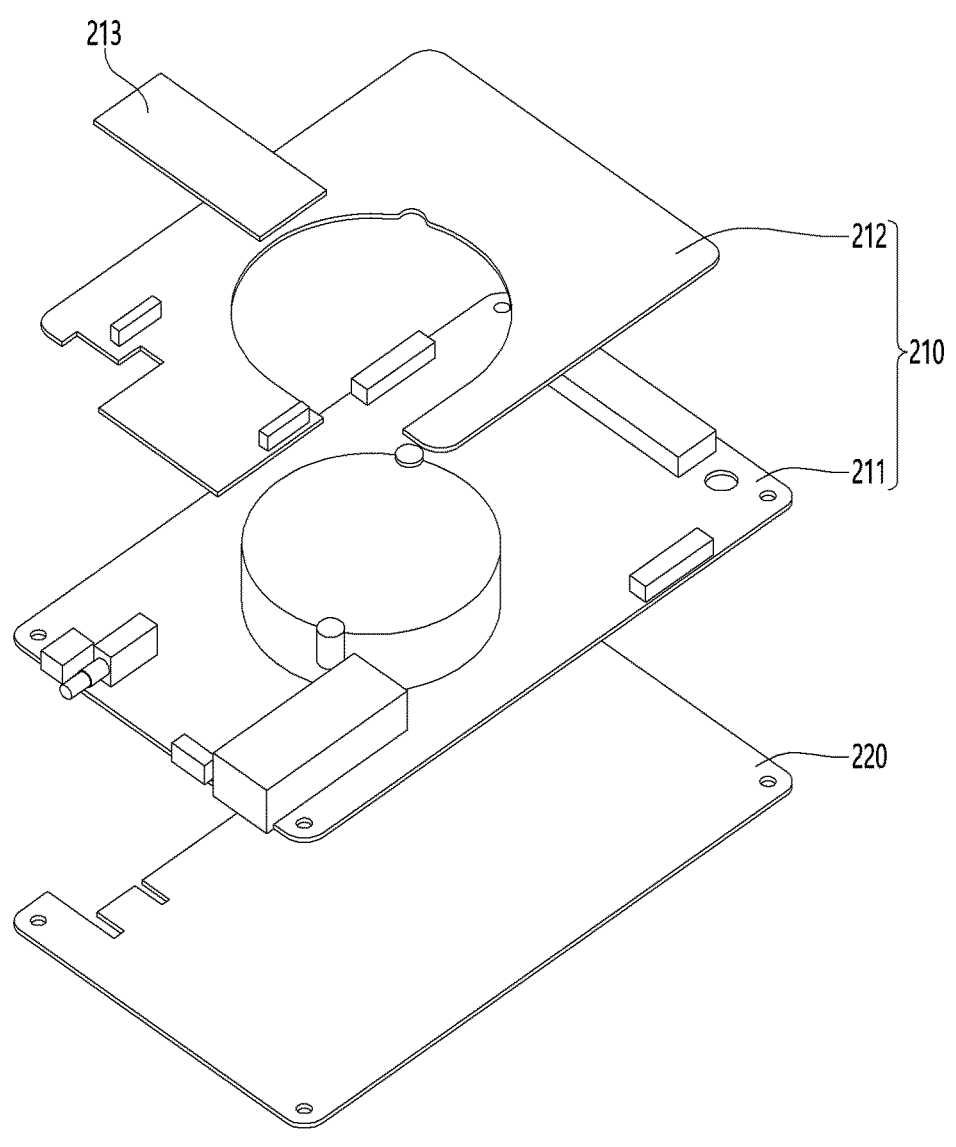

【FIG. 7】
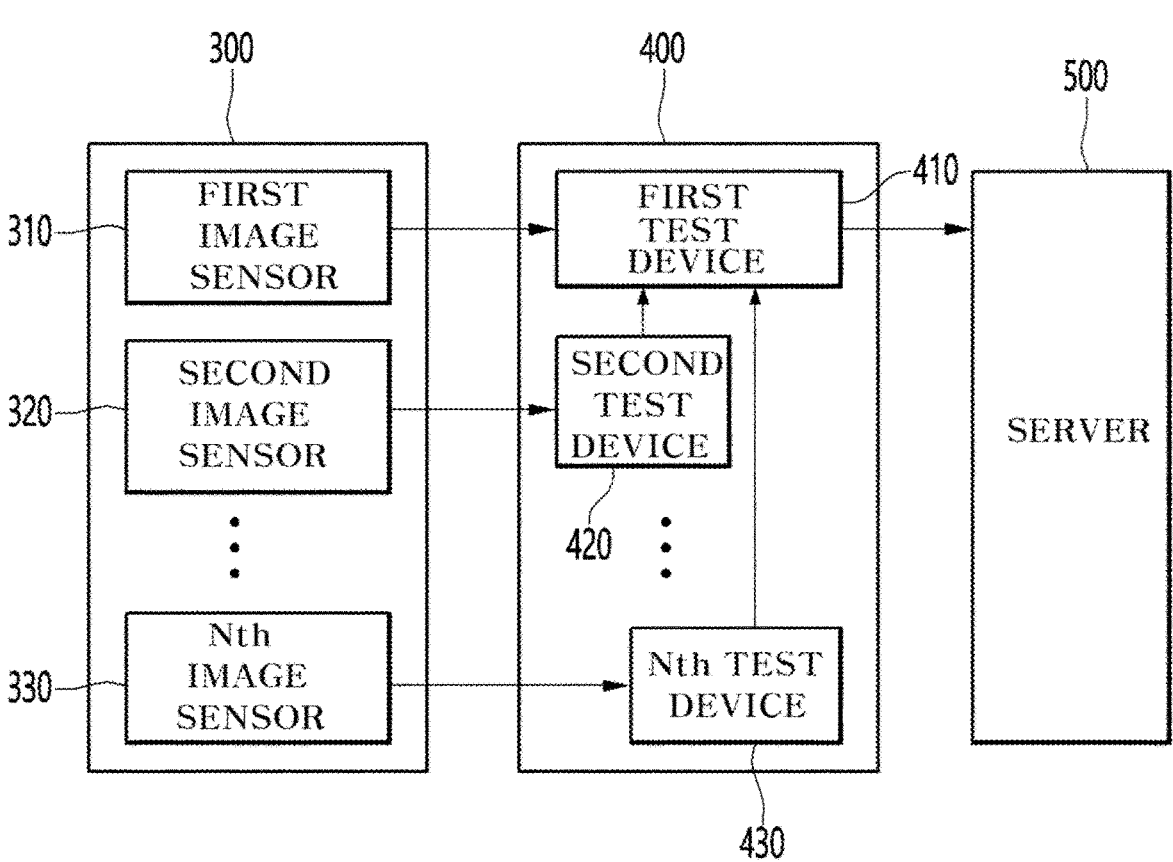
【FIG. 8】
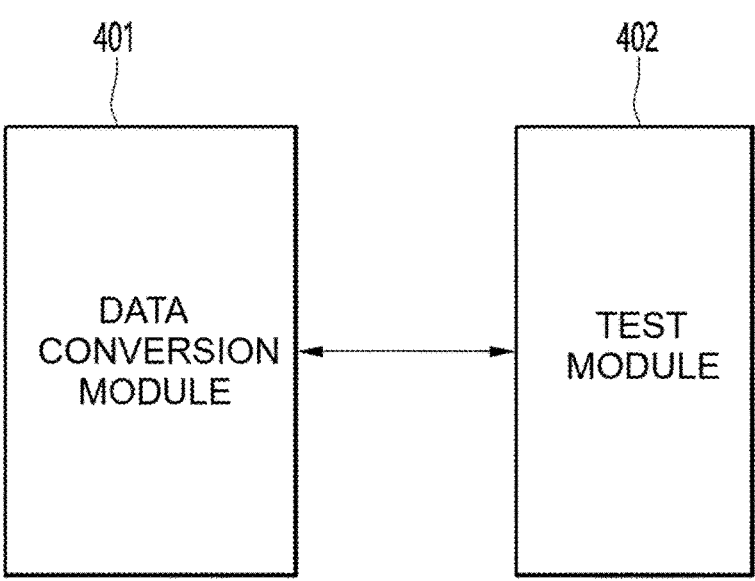

【FIG. 9】
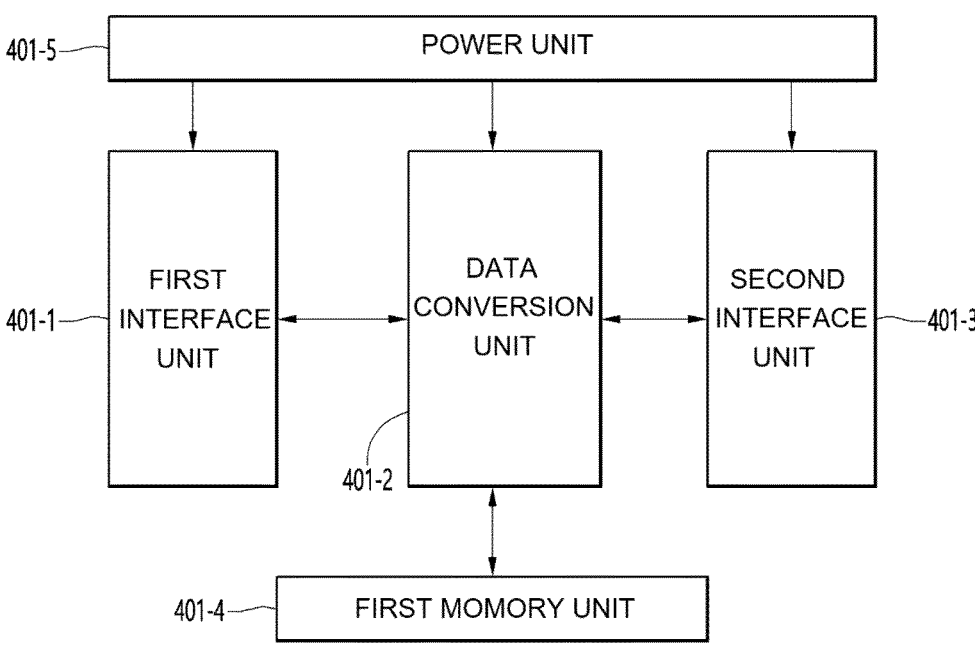
【FIG. 10】
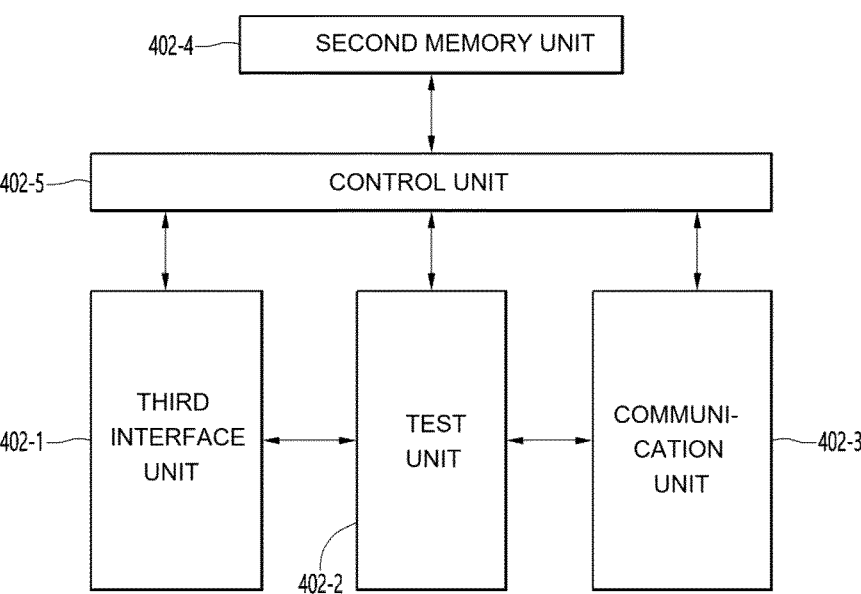

【FIG. 11】

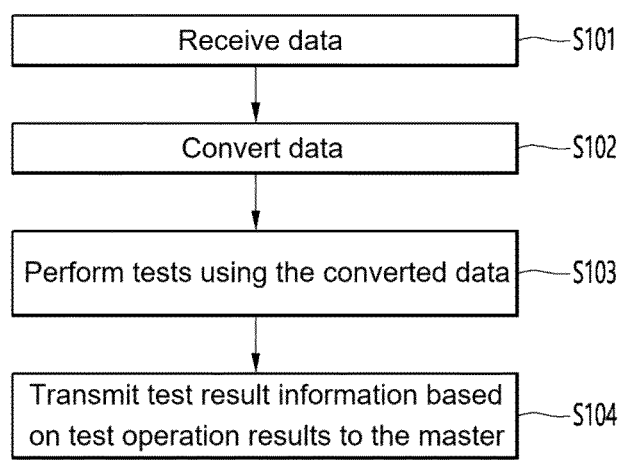

```
Receive data ──── S101

Convert data ──── S102

Perform tests using the converted data ──── S103

Transmit test result information based
on test operation results to the master ──── S104
```

【FIG. 12】

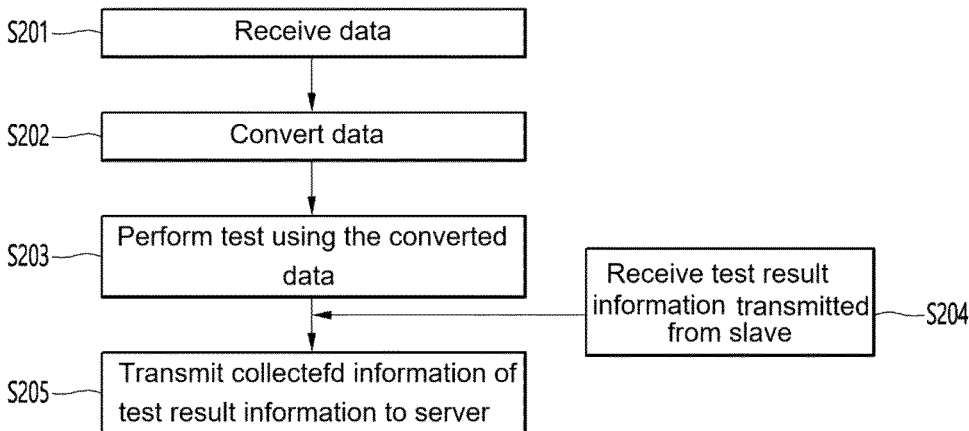

```
S201 ──── Receive data

S202 ──── Convert data

S203 ──── Perform test using the converted
           data

Receive test result
                                    information transmitted ──── S204
                                    from slave S205 ──── Transmit collectefd information of
           test result information to server
```

TEST DEVICE AND TEST SYSTEM COMPRISING SAME

CROSS-REFERENCE TO RELATED PATENT APPLICATIONS

This application is a U.S. National Stage Application under 35 U.S.C. § 371 of PCT Application No. PCT/KR2023/008909, filed Jun. 27, 2023, which claims priority to Korean Patent Application No. 10-2022-0080884, filed Jun. 30, 2022, whose entire disclosures are hereby incorporated by reference.

TECHNICAL FIELD

An embodiment relates to a test device, and more particularly to a test device comprising a frame grabber and a test device as a single module, and a test system including the same, and a test method thereof.

BACKGROUND ART

Recently, a test system for testing a quality of manufactured products has been provided.

The test system is equipped with a frame grabber. The frame grabber is also referred to an image collection board or an image acquisition board.

The frame grabber refers to a device that converts images from image media such as TV, video, and cameras into data that can be processed by a computer.

The frame grabber is provided in various forms of boards depending on a computer environment. For example, the frame grabber can be provided in a form of ISA (Industry Standard Architecture), PCI (Peripheral Component Interconnect), PCIe (PCI Express), CPCI (Compact PCI) for industrial use, VME (Versa Module Europa), etc.

The frame grabber receives a test image acquired through a camera and converts the image into data in a format that can be processed by the computer.

Meanwhile, the computer is commonly connected to a plurality of frame grabbers. Then, the computer receives data converted from each of the plurality of frame grabbers. In addition, the computer performs a quality test on test images acquired through each camera using the received data.

At this time, recent camera technology is developing, and accordingly, pixels of an image sensor equipped with the camera are increasing. Accordingly, a performance of the CPU and GPU equipped with the frame grabber is becoming more advanced.

Accordingly, a data capacity acquired from each frame grabber is increasing, and accordingly, a data capacity that the computer must process is also increasing.

Accordingly, the performance of the CPU equipped with the computer must be further improved, or a number of CPU cores must be increased, and accordingly, there is a problem that the cost required to configure the computer is increasing.

Furthermore, as a number of semiconductor chips equipped with the computer increases, or the data capacity processed by the semiconductor chips increases, an amount of heat generated from the semiconductor chips is increasing. In addition, there is a problem that a heat dissipation structure equipped with the computer becomes complex and a volume of the heat dissipation structure increases depending on the amount of heat generated. In addition, even if the heat dissipation structure is equipped, it may not be able to dissipate all the heat generated from the computer, and accordingly, there is a problem that the performance of the computer is deteriorated. Accordingly, the computer is separating a distance between a plurality of semiconductor chips as much as possible in order to solve the problem of heat generation, and accordingly, there is a problem that a volume of the computer is further increased.

In addition, the computer must process all data provided by multiple frame grabbers, which may increase the amount of data to be processed at a specific point in time, causing a bottleneck phenomenon. In addition, the bottleneck phenomenon may cause an overall performance of the computer to deteriorate.

Accordingly, a test device is required that can more efficiently process test images acquired through a camera and improve accuracy of test results based on a processed data.

DISCLOSURE

Technical Problem

An embodiment provides a test device, a test system, and a test method thereof capable of distributing processing data to a plurality of test devices.

In addition, the embodiment provides a test device, a test system, and a test method thereof capable of minimizing an amount of heat generation.

In addition, the embodiment provides a test device, a test system, and a test method thereof capable of minimizing data loss of a test image.

In addition, the embodiment provides a test device, a test system, and a test method thereof capable of improving test accuracy.

In addition, the embodiment provides a compact test device with improved circuit integration and a test system including the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A test device according to an embodiment comprises a first substrate including a data conversion module having a first connector for receiving data acquired from an external equipment, an FPGA (Field Programmable Gate Array) for converting the received data, and a second connector for outputting the converted data; a second substrate having a test module including a third connector connected to the second connector of the first substrate and receiving the converted data, a test unit for performing a test operation using the data received through the third connector, a communication unit for transmitting test result information according to a test operation result of the test unit to an outside, and a control unit for controlling the test unit and the communication unit; and a housing for accommodating the first substrate and the second substrate.

In addition, the first connector includes a MIPI (Mobile Industry Processor Interface), and the second and third connectors include a PCIe (Peripheral Component Interconnect Express).

In addition, the second substrate is disposed on the first substrate, the second substrate includes a port of the third connector disposed in an open region corresponding to the second connector, and the port is connected to the second connector.

In addition, the communication unit of the second substrate transmits the test result information to a test device set as a master.

In addition, the communication unit of the second substrate receives test result information from a test device set as a slave, and transmits the test result information acquired from the test unit and the test result information received from the test device set as the slave to a server.

In addition, the transmitted test result information includes identification information assigned to each test device and test judgment information according to test results performed on each test device.

Meanwhile, a test system according to an embodiment comprises a data acquisition device including a plurality of image sensors; and a first test device and a second test device each connected to the plurality of image sensors of the data acquisition device; wherein the first test device includes: a first data conversion unit adapted to convert data received from one of the plurality of image sensors; a first test unit adapted to perform a test operation using the data converted by the first data conversion unit; a first communication unit adapted to transmit first test result information according to a test operation result of the first test unit to the second test device; and a first control unit adapted to control the first data conversion unit, the first test unit, and the first communication unit; wherein the second test device includes: a second data conversion unit adapted to convert data received from another of the plurality of image sensors; a second test unit adapted to perform a test operation using the data converted by the second data conversion unit; a second communication unit adapted to receive the first test result information from the first communication unit and transmit the first test result information and second test result information according to a test operation result of the second test unit to a server; and a second control unit adapted to control the second data conversion unit, the second test unit, and the second communication unit.

In addition, the first and second data conversion units are frame grabbers including a Field Programmable Gate Array (FPGA).

In addition, a computational performance of the second control unit is higher than a computational performance of the first control unit.

In addition, the first test result information and the second test result information transmitted to the server includes identification information of each of the first and second test devices and test judgment information acquired from each of the first and second test devices.

Advantageous Effects

The test system of the embodiment includes a plurality of image sensors and a plurality of test devices respectively connected to the plurality of image sensors. Each of the plurality of test devices includes a data conversion module adapted to convert data transmitted from the image sensors and a test module adapted to analyze the data converted by the data conversion module and perform a quality test.

That is, the test system of the embodiment integrates the FPGA board performing the data conversion operation and the test board performing the test into a single module. Accordingly, the embodiment can perform individual test operations on data acquired from a specific image sensor in each test device. Through this, the embodiment can solve the reliability problem that occurs when a main computer of a comparative example performs a test on data acquired from all image sensors.

In addition, the embodiment connects a data conversion module and a test module using a connector while the data conversion module and the test module are respectively disposed on separate substrates. Through this, the embodiment can perform a test on data acquired from each frame grabber while using a conventional frame grabber as it is. In addition, the embodiment can be used by connecting the test module of the present invention to a data conversion module corresponding to an FPGA designed to correspond to each industrial group. Through this, the embodiment can provide a test device that can be used in all groups regardless of the industrial group.

Meanwhile, the embodiment can distribute components that are concentrated in a conventional main computer to each test device. Through this, the embodiment can solve a problem of all components being concentrated in the main computer, as in the comparative example. For example, the embodiment can distribute the components that are concentrated in the main computer to the test modules of each test device. Accordingly, the embodiment can simplify a heat dissipation structure of each test device. Furthermore, the embodiment can improve heat dissipation characteristics of the test device, thereby improving the performance of the test device. Furthermore, the embodiment can design only by considering a minimum separation distance that does not cause a performance problem due to the heat generation of each component equipped in the test device. Accordingly, the embodiment can improve the circuit integration or component density of the test device, and furthermore, it is possible to design the test device in a compact size.

DESCRIPTION OF DRAWINGS

FIG. 1 is a block diagram showing a schematic configuration of a test system according to a comparative example.

FIG. 2 is a top perspective view of a test device of an embodiment.

FIG. 3 is a bottom perspective view of a test device of an embodiment.

FIG. 4 is an exploded perspective view of a test device shown in FIGS. 2 and 3.

FIG. 5 is a drawing showing a modified example of a cover and a heat dissipation unit shown in FIG. 4.

FIG. 6 is an exploded perspective view showing a test device of another embodiment.

FIG. 7 is a schematic diagram showing a schematic configuration of a test system according to an embodiment.

FIG. 8 is a schematic diagram showing a detailed configuration of each test device of FIG. 7.

FIG. 9 is a schematic diagram showing a detailed configuration of a data conversion module of FIG. 8.

FIG. 10 is a schematic diagram showing a detailed configuration of a test module of FIG. 8.

FIG. 11 is a flowchart for describing a method of operating a test apparatus set as a slave, step by step.

FIG. 12 is a flowchart for describing a method of operating the test device set as the master, step by step.

MODE FOR INVENTION

Hereinafter, embodiments of the present disclosure will be described in detail with reference to the accompanying drawings.

However, the spirit and scope of the present disclosure is not limited to a part of the embodiments described, and may be implemented in various other forms, and within the spirit and scope of the present disclosure, one or more of the elements of the embodiments may be selectively combined and redisposed.

In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art. In addition, the terms used in the embodiments of the present disclosure are for describing the embodiments and are not intended to limit the present disclosure.

In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present disclosure, the terms such as first, second, A, B, (a), and (b) may be used.

These terms are only used to distinguish the elements from other elements, and the terms are not limited to the essence, order, or order of the elements. In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

Comparative Example

FIG. 1 is a block diagram showing a schematic configuration of a test system according to a comparative example.

Referring to FIG. 1, the test system of the comparative example includes a sensor unit (10), a frame grabber unit (20), a main computer (30), and a server (40).

The sensor unit (10) includes a plurality of image sensors. Specifically, the sensor unit (10) includes first to Nth image sensors (11, 12, 13). The sensor unit (10) refers to an image acquisition unit that acquires test images for testing a manufactured product. At this time, the test system simultaneously performs tests on a plurality of test items. At this time, each of the first to Nth image sensors (11, 12, 13) of the sensor unit (10) acquires a test image that captures a product corresponding to a corresponding test item.

The frame grabber unit (20) includes a frame grabber connected to the sensor unit (10). Specifically, the frame grabber unit (20) includes first to Nth frame grabbers (21, 22, 23). Each of the first to Nth frame grabbers (21, 22, 23) of the frame grabber unit (20) is connected 1:1 to each of the first to Nth image sensors (11, 12, 13) of the sensor unit (10).

In addition, the first to Nth frame grabbers (21, 22, 23) of the frame grabber unit (20) receive test images acquired through the first to Nth image sensors (11, 12, 13) and convert the received test images. Specifically, the first to Nth frame grabbers (21, 22, 23) convert test images acquired through the first to Nth image sensors (11, 12, 13) into data that can be processed by the main computer (30).

In addition, the first to Nth frame grabbers (21, 22, 23) of the frame grabber unit (20) transmit the converted data to the main computer (30). For example, the frame grabber unit (20) transmits the converted data to the main computer (30) using a signal transmission line such as an optical cable.

At this time, the frame grabber unit (20) must transfer all data converted from each frame grabber to the main computer (30), and accordingly, there is a problem that a data transmission method between the frame grabber unit (20) and the main computer (30) is limited.

In addition, a resolution of the first to Nth image sensors (11, 12, 13) included in the sensor unit (10) is increasing, and accordingly, a size of the transmitted data is becoming greater. Therefore, the comparative example has limitations in transmitting data converted in real time from the frame grabber unit (20) to the main computer (30). Furthermore, in the comparative example, there is a problem in that the time required to transmit the data increases, and the main computer (30) cannot process the converted data in real time.

In addition, in the comparative example, the frame grabber unit (20) modulates the converted data before transmitting the converted data to the main computer (30). In addition, the main computer (30) further includes a demodulation unit (not shown) demodulating the modulated data. Accordingly, the main computer 30 receives the modulated data and demodulates the received modulated data.

In the comparative example, a separate modulation process and a separate demodulation process is required to transmit the data. Therefore, in the comparative example, there is a problem that a hardware circuit configuration of the test system becomes complicated due to a need for the modulation and demodulation process of the data.

In addition, in the comparative example, there is a problem that data conversion errors may occur during the modulation and demodulation process of the data, resulting in loss of the data.

Meanwhile, the main computer (30) processes the data transmitted from each of the first to Nth frame grabbers (21, 22, 23) of the frame grabber unit (20). For example, the main computer (30) analyzes the data transmitted from each of the frame grabbers and performs a test on the analyzed data. Then, the main computer (30) transmits judgment result information according to a test result to the server (40).

At this time, the main computer (30) must process all the data transmitted from the first to Nth frame grabbers (21, 22, 23). Accordingly, the main computer (30) requires high performance to process all the data. That is, in the comparative example, the performance of the CPU equipped in the main computer (30) must be further enhanced or a number of CPU cores must be increased, and thus, there is a problem that the cost required to configure the computer increases.

In addition, the test system of the comparative example may experience a bottleneck phenomenon in which data is intensively transmitted to the main computer (30) at a specific time. In addition, when the bottleneck phenomenon occurs, the performance of the main computer (30) may deteriorate, and thus, there is a problem that the accuracy of the test judgment result deteriorates. In addition, the test system of the comparative example is overloaded due to having to process a large amount of data, which may cause reliability problems such as heat generation.

Therefore, the main computer (30) of the comparative example has a complicated problem of a heat dissipation structure to solve problems such as heat generation. Furthermore, even if the main computer (30) of the comparative example applies a heat dissipation structure, it may be difficult to solve the heat generation problem, and accordingly, the comparative example arranges heat-generating components as far apart as possible within the substrate. Therefore, the comparative example has a problem of further increasing a volume of the main computer.

The embodiment can solve the problem of the test system of the comparative example. Specifically, the embodiment provides a test system that can distribute the load of the main computer to a plurality of frame grabbers. Through this, the embodiment can increase test accuracy while enabling fast testing.

Below, a structure of each test device constituting the test system of the embodiment will be described.

The test device described below can correspond to any one of the first to Nth frame grabbers.

FIG. 2 is a top perspective view of a test device of an embodiment, FIG. 3 is a bottom perspective view of a test device of an embodiment, FIG. 4 is an exploded perspective view of a test device shown in FIGS. 2 and 3, FIG. 5 is a drawing showing a modified example of a cover and a heat dissipation unit shown in FIG. 4, and FIG. 6 is an exploded perspective view showing a test device of another embodiment.

Hereinafter, the structure of the test device according to the embodiment will be described with reference to FIGS. 2 to 6.

A test device (100) of one embodiment includes a housing (110), a cover (120), a first substrate (130), a second substrate (140), and a heat dissipation unit (150).

The housing (110) may include an accommodation space. Preferably, the housing (110) may include an accommodation space for accommodating each component constituting the test device (100).

The housing (110) can protect components accommodated in the accommodation space. For example, the housing (110) can protect each component constituting the test device (100) from various environmental factors (e.g., moisture, wind, temperature, etc.) occurring in an usage environment of the test device (100).

The housing (110) includes at least one through hole (111). For example, the housing (110) includes a through hole (111) formed on a lower surface of the housing (110) and exposing at least a portion of the components accommodated in the accommodation space.

The through hole (111) of the housing (110) can expose a portion of the first substrate (130) accommodated in the accommodation space. Preferably, the first substrate (130) includes a plurality of connectors. For example, the first substrate (130) includes a first connector (131).

In addition, the through hole (111) of the housing (110) may correspond to the first connector (131) of the first substrate (130). Preferably, the through hole (111) of the housing (110) may be formed to connect an external equipment to the first connector (131) of the first substrate (130). The external equipment may be a photographing device for acquiring a test image. For example, the external equipment may be a camera including an image sensor. In addition, the test device (100) may be connected to the external equipment through the first connector (131) with the first substrate (130) exposed through the through hole (111). Through this, the embodiment may receive a test image acquired through the external equipment.

Meanwhile, the housing (110) may further include at least one heat dissipation hole (not shown). The heat dissipation hole may be formed to extend in a short-axis direction from a lower surface of the housing (110). In addition, the heat dissipation holes may be formed in multiple numbers on the lower surface of the housing (110) and spaced apart from each other in a longitudinal direction. The heat dissipation holes of the housing (110) may discharge heat generated from components accommodated in the accommodation space to an outside.

A single module may be disposed in the accommodation space of the housing (110). For example, multiple substrates of the single module may be disposed in the accommodation space of the housing (110). The single module may include a data conversion module of a frame grabber corresponding to an FPGA and a test module for performing a test.

In addition, the single module includes multiple substrates.

One of the multiple substrates may be a data conversion module that performs data conversion corresponding to the frame grabber, and another substrate of the multiple substrates may be a test module that performs a test using data converted by the data conversion module.

For example, a first substrate (130) and a second substrate (140) are disposed in the accommodation space of the housing (110).

The first substrate (130) may be a data conversion module. The first substrate (130) may be a frame grabber. The first substrate (130) may be a FPGA (Field Programmable Gate Array) board. The first substrate (130) may be a power module for supplying driving power to each component constituting the test device (100).

Specifically, the first substrate (130) of the first embodiment may mean a module in which a power module and an FPGA module of a frame grabber are integrated.

The first substrate (130) may include a first connector (131). The first connector (131) of the first substrate (130) may be exposed to an outside of the housing (110) through a through hole (111) of the housing (110). In addition, the first substrate (130) can be coupled with the external equipment through the first connector (131) exposed through the through hole (111) of the housing (110). Through this, the first substrate (130) can receive data acquired from the external equipment connected to the first connector (131). The received data may be a photographed image of a product to be tested, but is not limited thereto.

The first substrate (130) is connected to the external equipment through the first connector (131). In addition, the first substrate (130) may be connected to the second substrate (140) through the second connector (132).

The second connector (132) may be an interface for connecting between the first substrate (130) and the second substrate (140). For example, the second connector (132) may be a PCI (Peripheral Controller Interface) port. Preferably, the second connector (132) may be a PCIe (PCI Express) port, but is not limited thereto. For example, the second connector (132) may be any one of a USB (Universal Serial Bus) port, an Ethernet port, a PCI (Peripheral Controller Interface) port, a PCI Express port, a CPCI (Compact PCI) port, an RJ-45 port, and an RS-232 port.

However, in order to improve signal transmission characteristics between the first substrate (130) and the second substrate (140), the embodiment connects the first substrate (130) and the second substrate (140) using a PCIe (PCI Express) interface.

The first substrate (130) includes a plurality of units mounted on the substrate. The plurality of units include the first connector (131) and the second connector (132) corresponding to the interface.

In addition, the first substrate (130) may include a power unit for receiving power and supplying driving power to each component, a data conversion unit (e.g., FPGA) for converting data received through the first connector (131), and a memory unit for storing data required for the data conversion operation. Preferably, the first substrate (130) may correspond to the frame grabber of the comparative example. However, the first substrate (130) of the embodiment includes a second connector (132) to be connected to the second substrate (140), and can transmit the converted data to the second substrate (140) through the second connector (132).

Meanwhile, the first substrate (130) may further include a connector for transmitting the converted data to a test device (e.g., a main computer of the comparative example) configured as a separate module from the frame grabber of the FPGA constituting the first substrate (130). For example, the first substrate (130) may further include an SFP port.

Therefore, when a test device is connected to the SFP port, the first substrate (130) can transmit the converted data to the SFP port.

In addition, when the second substrate (140) is connected to the second connector (132), the first substrate (130) can transmit the converted data to the second substrate (140).

The test device (100) includes a second substrate (140) coupled to the first substrate (130). The second substrate (140) may include a third connector (not shown) coupled to the second connector (132) of the first substrate (130).

At this time, the second substrate (140) may include an open region (141) corresponding to the second connector (132) of the first substrate (130). In addition, the second substrate (140) may be provided with a port corresponding to the open region (141). In addition, the second substrate (140) may be connected to the second connector (132) of the first substrate (130) at the open region (141).

The second substrate (140) may be connected to the first substrate (130) and thus may receive data transmitted from the first substrate (130). For example, the second substrate (140) can receive data converted through the data conversion unit of the first substrate (130).

The second substrate (140) can analyze data acquired from the external equipment using the received data. For example, the second substrate (140) can determine whether a product for a test subject is defective using an image acquired through the external equipment, which is a camera.

To this end, the second substrate (140) can include a plurality of units. For example, the second substrate (140) can include a test unit for performing a test operation using the data, a memory unit for storing data required to perform the test operation, a communication unit transmitting result information corresponding to the test operation to an outside, and a control unit for controlling an operation of the test unit and the communication unit.

A heat dissipation unit (150) is disposed on the second substrate (140). The heat dissipation unit (150) can be a heat sink. The heat dissipation unit (150) may be in contact with at least one of the first substrate (130) and the second substrate (140). The heat dissipation unit (150) may radiate heat generated from units disposed on the first substrate (130) and units disposed on the second substrate (140) to the outside. To this end, the heat dissipation unit (150) may include a material having high thermal conductivity.

The heat dissipation unit (150) may include a heat dissipation pin (151). The heat dissipation pin (151) of the heat dissipation unit (150) may absorb heat generated from the first substrate (130) and the second substrate (140) and transmit the absorbed heat in a direction in which the cover (120) is disposed.

That is, the heat dissipation unit (150) may disperse heat concentrated on the first substrate (130) and the second substrate (140) by using the heat dissipation pin (151). Meanwhile, the embodiment can improve the heat dissipation characteristics by arranging a heat dissipation pad or a heat dissipation agent between the heat dissipation unit (150) and the first substrate (130) and/or the second substrate (140).

A cover (120) can be disposed on the heat dissipation unit (150). The cover (120) can protect each component of the test device (100) together with the housing (110).

For example, the housing (110) can be referred to as a first cover covering side and lower portions of the test device (100), and the cover (120) can be referred to as a second cover covering an upper portion of the test device (100).

The cover (120) has a plurality of heat dissipation holes. For example, heat dissipation holes (121) corresponding to heat dissipation pins (151) of the heat dissipation unit (150) can be formed. The heat dissipation hole (121) of the cover (120) can radiate heat transmitted through the heat dissipation pin (151) to the outside.

Meanwhile, in FIGS. 2 to 4, the cover (120) and the heat dissipation unit (150) of the test device (100) are configured as separate components, but this is not limited thereto. For example, as shown in FIG. 5, the connector (131) and the heat dissipation unit (150) may be provided as a single heat dissipation cover (160) formed integrally with each other.

Specifically, the heat dissipation cover (160) includes a side plate (161). The side plate (161) of the heat dissipation cover (160) may be provided to surround an upper edge region of the second substrate (140). For example, the side plate (161) of the heat dissipation cover (160) may cover the upper edge region of the second substrate (140).

The side plate (161) may include at least one open region (161a). For example, the side plate (161) may include an open region (161a) that opens at least a portion of an upper edge region of the second substrate (140). Preferably, the side plate (161) may be formed to correspond to a unit that should be exposed to the outside among the units disposed on the second substrate (140). For example, a unit that should be exposed to the outside may be disposed in an edge region of the upper surface of the second substrate (140). In addition, the open region (161a) may be formed to correspond to an edge region of the side plate (161) where the unit is disposed.

The heat dissipation cover (160) may include an upper plate (162). The upper plate (162) may extend from the side plate (161). The upper plate (162) of the heat dissipation cover (160) may cover the upper region of the second substrate (140).

The heat dissipation cover (160) may include heat dissipation pins (163) protruding upward from the upper plate (162).

For example, the heat dissipation cover (160) may include a plurality of heat dissipation pins (163) extending in a first horizontal direction on the upper plate (162) and spaced apart in a second horizontal direction perpendicular to the first horizontal direction. The plurality of heat dissipation pins (163) may radiate heat generated in the first substrate (130) and the second substrate (140) in an upward direction (for example, in a direction away from the first substrate and the second substrate).

In addition, the heat dissipation cover (160) may include a protrusion (164) provided in a region that vertically overlaps with a unit disposed on the second substrate (140) among an entire region of the upper plate (162). The protrusion (164) may function as an accommodation space that accommodates a unit disposed on the second substrate (140). To this end, the upper plate (162) may have an open structure in a region that vertically overlaps with the protrusion (164), but is not limited thereto.

As described above, the test device (100) of the embodiment may configure one module by connecting the first substrate (130) and the second substrate (140) to each other through a connector. Through this, the embodiment may perform conversion of data acquired from the external equipment and testing thereof in each test device (100).

Through this, the embodiment may solve a problem that occurs when testing all data on the main computer.

In addition, the embodiment connects a configuration for converting data and a configuration for performing the test by using a connector while being disposed on separate substrates. Through this, the embodiment can perform a test of data acquired from each frame grabber while using the conventional frame grabber as it is.

At this time, the first substrate (130) may be an FPGA substrate designed for each industrial group. In addition, the second substrate (140) may be a test substrate that can be commonly used regardless of the industrial group. Through this, the embodiment can combine the second substrate (140) on an FPGA substrate designed to correspond to each industrial group. By this, the embodiment can provide a test device that can be used in all groups regardless of the industrial group.

Meanwhile, a unit for analyzing and testing only the data acquired from the first substrate (130) may be mounted on the second substrate (140). Through this, the problem of all units being concentrated on the main computer (30) as in the comparative example can be solved. For example, the embodiment can distribute the units concentrically disposed in the main computer (30) to the second substrate (140) of each test device (100). Accordingly, the embodiment can simplify the heat dissipation structure of each test device (100). Furthermore, the embodiment can improve the heat dissipation characteristics of the test device (100), thereby improving the performance of the test device (100). Furthermore, the embodiment can be designed by considering only a minimum separation distance that does not cause a performance problem due to the heat generation of each unit equipped in the test device (100). Accordingly, the embodiment can improve the circuit integration or component density of the test device (100), and furthermore, the test device (100) can be designed in a compact size.

Meanwhile, the first substrate (130) of the embodiment can be designed by being divided into a plurality of substrates.

For example, depending on the industrial group to which the test device is applied, the FPGA substrate and the power substrate can be designed by being divided into separate substrates.

Through this, as shown in FIG. 6, the test device includes a first substrate (210) and a second substrate (220).

The second substrate (220) corresponds to the second substrate (140) of the first embodiment. Accordingly, a detailed description of the second substrate (220) is omitted.

The first substrate (210) may be divided into a plurality of substrates.

The first substrate (210) includes a first sub-substrate (211) and a second sub-substrate (212).

The first sub-substrate (211) may correspond to an FPGA substrate. The first sub-substrate (211) may be connected to the external equipment and may receive data acquired from the external equipment. In addition, the first sub-substrate (211) may convert the received data into data that can be processed by the second substrate (220). In addition, the first sub-substrate (211) can be connected to the second substrate (220) and transmit the converted data to the second substrate (220).

The second sub-substrate (212) can be connected to the first sub-substrate (211) and the second substrate (220). The second sub-substrate (212) can include a power connector. The second sub-substrate (212) can receive power from the outside. In addition, the second sub-substrate (212) can convert the received power into driving power required by each component. In addition, the second sub-substrate (212) can supply the converted driving power to the first sub-substrate (211) and the second substrate (220).

Meanwhile, the second sub-substrate (212) may further include a strobe substrate (213).

The strobe substrate (213) may be provided when an additional high-performance test is required in an environment where the test device is applied. At this time, the strobe substrate (213) is illustrated as being provided to the second sub-substrate (212) in the drawing, but is not limited thereto. For example, the strobe substrate (213) may be provided to either the first sub-substrate (211) or the second substrate (220).

The strobe substrate (213) may include a lighting device that irradiates light to a product to be tested or the surroundings of the product when acquiring a photographed image from external equipment. The strobe substrate (213) may operate when a high-performance test is required, and irradiate light to the product to be tested or the surroundings thereof.

The following is a detailed description of an internal configuration and operation of the test device according to the embodiment.

FIG. 7 is a schematic diagram showing a configuration of a test system according to an embodiment.

Referring to FIG. 7, the test system may include a data acquisition device (300), a test device (400), and a server (500).

The data acquisition device (300) may acquire test-related data of a product to be tested through the test device. For example, the data acquisition device (300) may acquire a photographed image of the product to be tested. Accordingly, the data acquisition device (300) may be a camera including an image sensor.

The data acquisition device (300) may include a plurality of image sensors corresponding to a plurality of cameras.

For example, the data acquisition device (300) may include a first image sensor (310) for acquiring first data, a second image sensor (320) for acquiring second data, and an Nth image sensor (330) for acquiring Nth data.

The first to Nth image sensors (310, 320, 330) can acquire test images from different products. Alternatively, the first to Nth image sensors (310, 320, 330) can acquire test images from a same product. For example, at least two image sensors among the first to Nth image sensors (310, 320, 330) can acquire test images from a same first product, and at least one image sensor can acquire test images from a second product different from the first product. However, the embodiment is not limited thereto, and the test images acquired from the first to Nth image sensors (310, 320, 330) may vary depending on an industrial group to which the product is applied.

Meanwhile, when the test system of the embodiment is used to test the quality of a product such as a camera, the first to Nth image sensors (310, 320, 330) can acquire test images for inspection of chip components, printed substrates labels, IC stamping, surface inspection, stamping, foreign matter, scratches, and blemishes.

The test device (400) can receive data acquired through the data acquisition device (300) and perform a test using the received data. The test device (400) includes a plurality of test devices. The test device (400) includes a plurality of test devices each connected to the first to Nth image sensors (310, 320, 330).

Each of the plurality of test devices can correspond to the test device (100) described in the previous drawing.

The test device (400) can include the first to Nth test devices (410, 420, 430).

For example, the test device (400) may include a first test device (410) connected to a first image sensor (310). For example, the test device (400) may include a second test device (420) connected to a second image sensor (320). For example, the test device (400) may include an Nth test device (430) connected to an Nth image sensor (330).

The first to Nth test devices (410, 420, 430) are connected to the first to Nth image sensors (310, 320, 330), respectively. In addition, the first to Nth test devices (410, 420, 430) may analyze data provided from the first to Nth image sensors (310, 320, 330), respectively, and perform a corresponding quality test operation.

The first to Nth test devices (410, 420, 430) may include corresponding configurations. For example, the first to Nth test devices (410, 420, 430) may include identical components.

However, in the test system of the embodiment, one of the first to Nth test devices (410, 420, 430) may be set as a master, and other test devices may be set as slaves. In addition, the test device set as a master may include a different configuration from the test devices set as a slave. This will be described in detail below.

Among the first to Nth test devices (410, 420, 430), the test device set as a slave may transmit information according to a test result to the test device set as the master.

In addition, among the first to Nth test devices (410, 420, 430), a test device set as a master can collect test result information corresponding to a test result performed by the master test device and test result information provided from the slave test devices and transmit the collected test result information to the server (500).

At this time, the test result information can include identification information and judgment information. The identification information can indicate which of the test result information is data acquired from one of the first to Nth image sensors (310, 320, 330). In addition, the judgment information can mean quality judgment information corresponding to the test result. For example, the judgment information can be information indicating whether the corresponding product is good or defective.

Hereinafter, the test device of FIG. 7 will be described in detail.

FIG. 8 is a schematic diagram showing a detailed configuration of each test device of FIG. 7, FIG. 9 is a schematic diagram showing a detailed configuration of a data conversion module of FIG. 8, and FIG. 10 is a schematic diagram showing a detailed configuration of a test module of FIG. 8.

Referring to FIG. 8, the test device (400) of the embodiment includes a data conversion module (401) and a test module (402).

Specifically, the first to Nth test devices (410, 420, 430) each include a data conversion module (401) and a test module (402).

At this time, one of the first to Nth test devices (410, 420, 430) is set as a master, and other test devices are set as slaves. In addition, the test device set as a master and the test device set as a slave each include the data conversion module (401) and the test module (402) of FIG. 8. However, the test module of the test device set as the master may perform different operations or include different components than the test module of the test device set as the slave.

Meanwhile, each of the first to Nth test devices (410, 420, 430) includes a data conversion module (401) and a test module (402). At this time, the data conversion module (401) may correspond to the first substrate (130) described in the previous drawing. For example, the data conversion module (401) may include units provided in the first substrate (130). In addition, the test module (402) may correspond to the second substrate (140) described in the previous drawing. For example, the test module (402) may include units provided in the second substrate (140).

Referring to FIG. 9, the data conversion module (401) includes a first interface unit (401-1).

The first interface unit (401-1) may be an interface connected to any one specific image sensor among the first to Nth image sensors (310, 320, 330). For example, the first interface unit (401-1) may be a MIPI (Mobile Industry Processor Interface), but is not limited thereto.

The first interface unit (401-1) may be connected to any one specific image sensor and may receive image data acquired from the connected specific image sensor through the MIPI.

The data conversion module (401) may include a data conversion unit (401-2) connected to the first interface unit (401-1).

The data conversion unit (401-2) may convert data received from the first interface unit (401-1) into a signal that can be processed by the test module (402). For example, the data conversion unit (401-2) may be an FPGA.

The data conversion module (401) may include a first memory unit (401-4). The first memory unit (401-4) may store data required for the operation of each component of the data conversion module (401) or data generated during the operation. The first memory unit (401-4) may be various storage devices such as a ROM, a RAM, an EPROM, a flash drive, a hard drive, etc. in terms of hardware.

The data conversion module (401) may include a second interface unit (401-3). The second interface unit (401-3) may transmit data converted by the data conversion unit (401-2) to the test module (402). The second interface unit (401-3) may be implemented as PCIe, but is not limited thereto. The second interface unit (401-3) may correspond to the second connector (132) described in the previous drawing.

The data conversion module (401) of the embodiment can directly transmit the data converted by the data conversion unit (401-2) to the test module (402) through the second interface unit (401-3). Through this, the embodiment can omit the data modulation and demodulation operation performed to transmit the converted data. Furthermore, the embodiment can minimize a data transmission line, thereby minimizing a loss of the transmitted data. Furthermore, the embodiment can increase the test accuracy performed by the test module (402) by minimizing the data loss.

Meanwhile, the data conversion module (401) can include a power unit (401-5). The power unit (401-5) can receive power from an outside and supply a driving power required by each component constituting the data conversion module (401). To this end, the power unit (401-5) can include a DC-DC converter, but is not limited thereto.

Meanwhile, the power unit (401-5) may be disposed on one substrate together with the first interface unit (401-1), the second interface unit (401-3), the first memory unit (401-4), and the data conversion unit (401-2), or, alternatively, may be disposed on different substrates as illustrated in FIG. 6.

Referring to FIG. 10, the test module (402) includes a third interface unit (402-1). The third interface unit (402-1) may be connected to the second interface unit (401-3) of the data conversion module (401). Accordingly, the third interface unit (402-1) may be implemented with the PCIe.

The third interface unit (402-1) may receive data transmitted through the second interface unit (401-3). For example, the third interface unit (402-1) can receive data converted through the data conversion unit (401-2).

The test module (402) includes a test unit (402-2). The test unit (402-2) can receive the converted data and analyze the converted data. In addition, the test unit (402-2) can acquire test result information according to an analysis result of the data. For example, the test module (402) can acquire test result information indicating whether the product to be tested is good or defective through the analysis of the data.

The communication unit (402-3) can transmit the data result information acquired through the test unit (402-2) to an outside. At this time, the test result information can include identification information and test judgment information. The identification information can be its own identification information or identification information of the image sensor. For example, each test device constituting the test device (400) can be assigned different identification information to distinguish the test devices. In addition, the communication unit (402-3) can transmit test judgment information according to the test result together with the assigned identification information to the outside.

The communication unit (402-3) may be a wireless Internet communication unit. For example, the communication unit (402-3) may include a module for wireless Internet access. Accordingly, the communication unit (402-3) is configured to transmit and receive wireless signals in a communication network according to wireless Internet technologies.

Wireless Internet technologies may include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced), but the embodiment is not limited thereto.

Meanwhile, the communication unit (402-3) may transmit the test result information using a local area network. For example, the communication unit (402-3) may support short-range communication using at least one of Bluetooth (Bluetooth™ RFID (Radio Frequency Identification), Infrared Data Association; IrDA), UWB (Ultra-Wideband), ZigBee, NFC (Near Field Communication), Wi-Fi (Wireless-Fidelity), Wi-Fi Direct, and Wireless USB (Wireless Universal Serial Bus) technologies.

Meanwhile, the test result information transmitted through the communication unit (402-3) may have a different destination depending on whether the test device is a master or a slave.

For example, if the communication unit (402-3) is a communication unit equipped in a slave test device, the communication unit (402-3) may transmit the test result information to a master test device set as a master.

In addition, if the communication unit (402-3) is a test device set as a master, the communication unit (402-3) may receive the test result information transmitted from a test device set as a slave and collect the received test result information. In addition, the communication unit (402-3) can transmit the collected test result information together with the test result information acquired from its own test device to the server (500).

The second memory unit (402-4) can store data necessary for the operation of the test module (402) or data generated during the operation.

For example, the second memory unit (402-4) can store a test program necessary for performing a test through the test unit (402-2). In addition, the second memory unit (402-4) can store the test result information acquired from the test unit (402-2).

In addition, in a case of the second memory unit (402-4) equipped in the test device set as the master, the second memory unit (402-4) can store the test result information transmitted from the test device set as the slave.

In addition, in a case of the second memory unit (402-4) equipped in the test device set as the master, the second memory unit (402-4) can store a driving program for collecting the received test result information and transmitting the collected test result information to the server (500).

The control unit (402-5) controls the overall operation of the test module (402). When data is received through the third interface unit (402-1), the control unit (402-5) may be controlled to proceed with analysis and testing of the data received by the above test unit (402-2).

In addition, the control unit (402-5) can store test result information according to the test progress in the second memory unit (402-4).

In addition, the control unit (402-5) equipped in the test device set as the slave can cause the test result information to be transmitted to the communication unit of the test device set as the master through the communication unit (402-3).

In addition, the control unit (402-5) equipped in the test device set as the master can receive the test result information transmitted from the test device set as the slave and collect the received test result information. In addition, the control unit (402-5) equipped in the test device set as the master can transmit the collected test result information together with the test result information acquired from its own test device to the server (500).

To this end, the control unit equipped in the test device set as the master and the control unit equipped in the test device set as the slave can have different specifications. For example, the control unit equipped in the test device set as the master and the control unit equipped in the test device set as the slave can have different computational performances. Preferably, the computational performance of the control unit equipped in the test device set as the master can be higher than the computational performance of the control unit equipped in the test device set as the slave.

Specifically, the control unit equipped in the test device set as slave only controls the test operation in its own test module, and the transmission operation for transmitting the test result information according to the test result to the test device set as master.

In contrast, the control unit equipped in the test device set as a master must perform an additional operation for collecting the test result information transmitted from the test device set as a slave. Furthermore, the control unit equipped in the test device set as a master must selectively process the received test result information. Accordingly, the computational performance of the control unit equipped in the test device set as a master is made higher than the computational performance of the control unit equipped in the test device set as a slave.

Hereinafter, the embodiment will explain the operation method of the test device step by step. FIG. 11 is a flowchart for describing a method of operating a test apparatus set as a slave, step by step, and FIG. 12 is a flowchart for describing a method of operating the test device set as the master, step by step.

Referring to FIG. 11, the first interface unit (401-1) of the test device set as a slave receives data transmitted from a connected image sensor (S101).

In addition, the data conversion unit (401-2) of the test device set as a slave converts the received data into a signal that can be processed by the test module (402) (S102). Thereafter, the second interface unit (401-3) of the test device set as a slave transmits the converted data to the third interface unit (402-1) of the test module (402).

In addition, the test module (402) of the test device set as a slave can receive the converted data through the third interface unit (402-1) and perform a test operation using the received data (S103).

Thereafter, the communication unit (402-3) of the test device set as a slave can transmit test result information according to the test operation result to the communication unit of the test device set as a master (S104).

Referring to FIG. 12, the first interface unit (401-1) of the test device set as a master receives data transmitted from a connected image sensor (S201).

In addition, the data conversion unit (401-2) of the test device set as the master converts the received data into a signal that can be processed by the test module (402) (S202). Thereafter, the second interface unit (401-3) of the test device set as the master transmits the converted data to the third interface unit (402-1) of the test module (402).

In addition, the test module (402) of the test device set as the master can receive the converted data through the third interface unit (402-1) and perform a test operation using the received data (S203).

At this time, the communication unit (402-3) of the test device set as the master can receive the test result information transmitted from the test device set as the slave (S204).

Thereafter, the control unit (402-5) of the test device set as the master can collect test result information acquired from its own test device and test result information transmitted from the test device of the slave, and transmit the collected test result information to the server 500, S205.

The test system of the embodiment includes a plurality of image sensors and a plurality of test devices respectively connected to the plurality of image sensors. Each of the plurality of test devices includes a data conversion module adapted to convert data transmitted from the image sensors and a test module adapted to analyze the data converted by the data conversion module and perform a quality test.

That is, the test system of the embodiment integrates the FPGA board performing the data conversion operation and the test board performing the test into a single module.

Accordingly, the embodiment can perform individual test operations on data acquired from a specific image sensor in each test device. Through this, the embodiment can solve the reliability problem that occurs when a main computer of a comparative example performs a test on data acquired from all image sensors.

In addition, the embodiment connects a data conversion module and a test module using a connector while the data conversion module and the test module are respectively disposed on separate substrates. Through this, the embodiment can perform a test on data acquired from each frame grabber while using a conventional frame grabber as it is. In addition, the embodiment can be used by connecting the test module of the present invention to a data conversion module corresponding to an FPGA designed to correspond to each industrial group. Through this, the embodiment can provide a test device that can be used in all groups regardless of the industrial group.

Meanwhile, the embodiment can distribute components that are concentrated in a conventional main computer to each test device. Through this, the embodiment can solve a problem of all components being concentrated in the main computer, as in the comparative example. For example, the embodiment can distribute the components that are concentrated in the main computer to the test modules of each test device. Accordingly, the embodiment can simplify a heat dissipation structure of each test device. Furthermore, the embodiment can improve heat dissipation characteristics of the test device, thereby improving the performance of the test device. Furthermore, the embodiment can design only by considering a minimum separation distance that does not cause a performance problem due to the heat generation of each component equipped in the test device. Accordingly, the embodiment can improve the circuit integration or component density of the test device, and furthermore, it is possible to design the test device in a compact size.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A test device comprising:
a first substrate including a data conversion module having a first connector for receiving data acquired from an external equipment, an FPGA (Field Programmable Gate Array) for converting the received data, and a second connector for outputting the converted data;
a second substrate having a test module including a third connector connected to the second connector of the first substrate and receiving the converted data, a test unit for performing a test operation using the data received through the third connector, a communication unit for transmitting test result information according to a test operation result of the test unit to an outside, and a control unit for controlling the test unit and the communication unit; and a housing for accommodating the first substrate and the second substrate, wherein if the communication unit is set as a slave, the test result information is transmitted to a first destination, and if the communication unit is set as a master, the test result information is transmitted to a second destination different from the first destination.

2. The test device of claim 1, wherein the first connector includes a MIPI (Mobile Industry Processor Interface), and wherein the second and third connectors include a PCIe (Peripheral Component Interconnect Express).

3. The test device of claim 1, wherein the second substrate is disposed on the first substrate, wherein the second substrate includes a port of the third connector disposed in an open region corresponding to the second connector, and wherein the port is connected to the second connector.

4. The test device of claim 1, wherein the communication unit is set as the slave, and wherein the communication unit of the second substrate transmits the test result information to a test device set as a master.

5. The test device of claim 1, wherein the communication unit is set as the master, and wherein the communication unit of the second substrate receives test result information transmitted from a test device set as a slave, collects the received test result information with the test result information according to the test operation result of the test unit, and transmits the collected test result information to a server.

6. The test device of claim 5, wherein the transmitted test result information includes identification information assigned to each test device and test judgment information according to test results performed on each test device.

7. The test device of claim 1, wherein the first substrate includes a first sub-substrate and a second sub-substrate, wherein the first sub-substrate includes the FPGA, and wherein the second sub-substrate includes a power connector disposed between the first sub-substrate and the second substrate.

8. The test device of claim 7, wherein the second sub-substrate further includes a strobe substrate, and wherein the strobe substrate includes a lighting device that irradiates light to a test subject.

9. The test device of claim 4, wherein the control unit obtains identification information and test judgment information according to the test operation result, and transmits the test result information including the identification information and the test judgement information to the test device set as the master.

10. The test device of claim 5, wherein the control unit acquires identification information and test judgment information according to the test operation result, acquires the test result information including the identification information and the test judgement information, receives the test result information including the identification information and the test judgment information transmitted from the test device set as the slave, and collects the acquired test result information and the received test result information and transmits the collected test result information to the server.

*   *   *   *   *